United States Patent [19]

Schwieker

[11] Patent Number: 4,754,348

[45] Date of Patent: Jun. 28, 1988

[54] SERIAL CHANGER INCLUDING A MEASURING DEVICE FOR DETERMINING THE FORMAT OF A CASSETTE

[75] Inventor: Horst-Hartwig Schwieker, Hamburg, Fed. Rep. of Germany

[73] Assignee: U.S. Philips Corp., New York, N.Y.

[21] Appl. No.: 872,056

[22] Filed: Jun. 6, 1986

[30] Foreign Application Priority Data

Jun. 7, 1985 [DE] Fed. Rep. of Germany ........ 3520422

[51] Int. Cl.⁴ .............................................. G11B 17/00
[52] U.S. Cl. ..................................................... 360/94
[58] Field of Search ..................... 360/94, 92, 93, 96.1, 360/96.5, 132; 242/199; 384/178

[56] References Cited

U.S. PATENT DOCUMENTS

| | | | |
|---|---|---|---|
| 4,005,488 | 1/1977 | Asai et al. | 360/94 |
| 4,432,095 | 2/1984 | Adelmeyer et al. | 378/181 |
| 4,476,505 | 10/1984 | Ogata et al. | 360/94 |
| 4,489,428 | 12/1984 | Schwieker | 378/176 |

FOREIGN PATENT DOCUMENTS

| | | | |
|---|---|---|---|
| 1961508 | 11/1971 | Fed. Rep. of Germany | 360/94 |
| 58-212680A | 12/1983 | Japan | 360/94 |

*Primary Examiner*—John H. Wolff
*Attorney, Agent, or Firm*—Thomas A. Briody; Jack E. Haken

[57] ABSTRACT

A serial cassette changer in which the height and the width of a cassette in a cassette carriage are measured. The positions of two markers are controlled by levers which bear against the sides of the cassette, so that the angular positions of the markers are determined by the cassette dimensions. The angular positions of the markers are then "read" by an optical source and sensor by moving the cassette carriage (bearing the markers) across the field of view of the optical reader.

14 Claims, 3 Drawing Sheets

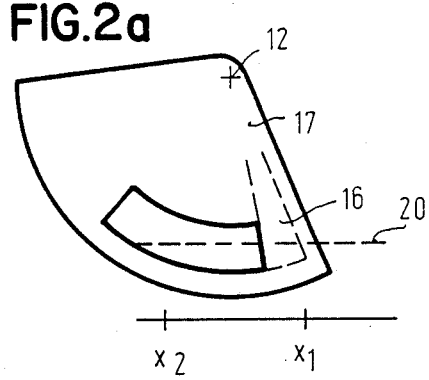
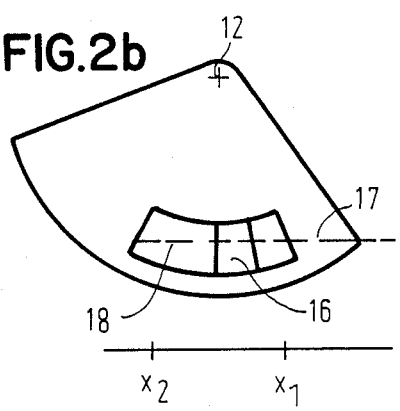
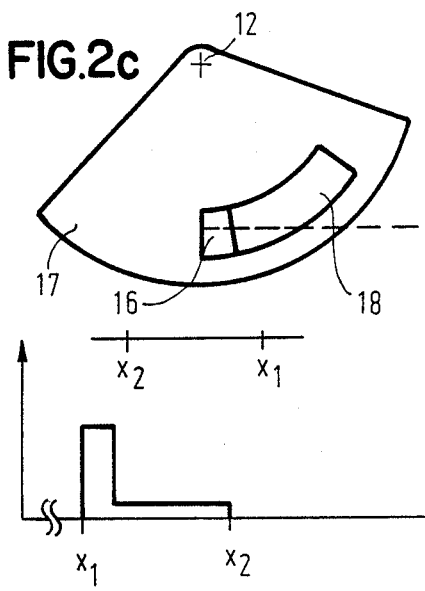

SERIAL CHANGER INCLUDING A MEASURING DEVICE FOR DETERMINING THE FORMAT OF A CASSETTE

BACKGROUND OF THE INVENTION

The invention relates to a serial changer which includes a cassette carriage provided with two clamping means for cassettes, the position of the first clamping means being determined by the height of the cassette while the position of the second clamping means is determined by the width of the cassette, and also includes a measuring device which determines the format of the cassette from the position of the clamping means.

A measuring device of this kind is known from German Patent Application No. P 31 22 723 (corresponding to U.S. Pat. No. 4,489,428). In the known device a measuring point is coupled to the two clamping means in such a manner that the change of its position in reaction to an adjustment of one clamping means deviates from that in reaction to a corresponding adjustment of the other clamping means. Thus, the position of the measuring point is an unambiguous measure of the width and the height of the inserted cassette (when standard cassettes are used), so that these dimensions can be determined by means of a single measurement.

SUMMARY OF THE INVENTION

It is an object of the present invention to provide a serial changer of the kind set forth where the format, (i.e. the height and the width) of the inserted cassette can also be determined by means of a single measuring device.

This object is achieved in accordance with the invention in that a marker is pivotably coupled to each of the clamping means so that the angular position thereof is a measure of the position of the associated clamping means, the measuring device including a sensor which is rigidly connected to the serial changer and which reacts to the markers, said sensor being arranged so that the markers are guided past the sensor when the cassette carriage is displaced.

Thus, in accordance with the invention the position of the two clamping means which is determined by the cassette format is converted into a corresponding angular position of the markers pivotally coupled thereto. During displacement of the cassette carriage these markers are guided past the sensor sooner or later, depending on the cassette format, so that the output signal of the sensor, being activated only when the marker is situated directly opposite the sensor during passage, will contain the information necessary for determining the cassette format.

BRIEF DESCRIPTION OF THE DRAWING

The invention will be described in detail hereinafter with reference to the drawing. Therein:

FIGS. 2a to 2c illustrate the positions of the two markers for different cassette formats, FIGS. 3a to 3c show the associated sensor output signals.

DESCRIPTION OF THE PREFERRED EMBODIMENTS

Figure 1:
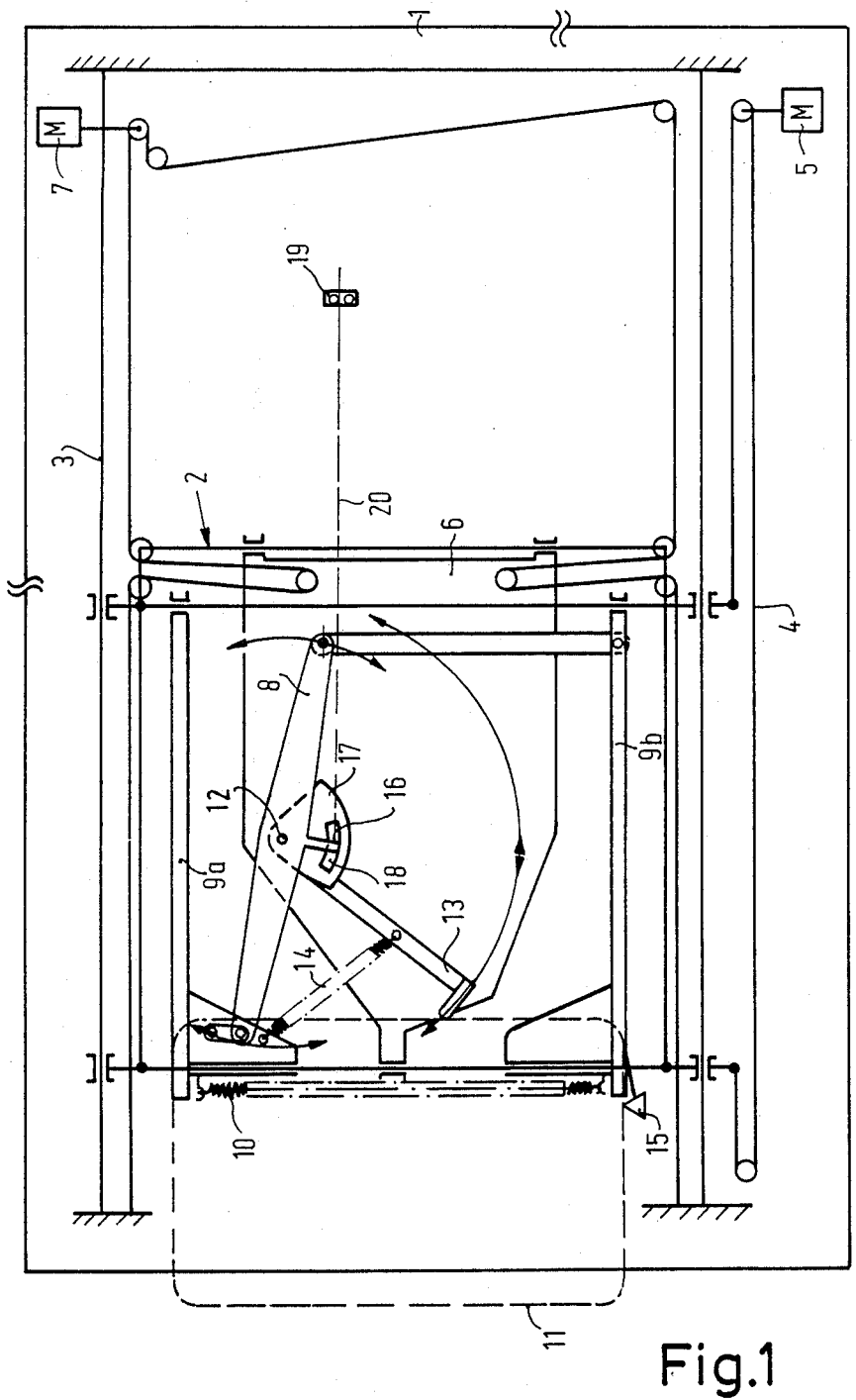
FIG. 1 schematically shows a serial changer in accordance with the invention.

The serial changer has a housing 1, shown only as a contour for the sake of clarity. Housing 1 bears a cassette carriage 2 which can be displaced in the horizontal direction on horizontal guide rails 3 and 4 by means of an electric motor 5, preferably a stepping motor. The cassette carriage 2 also supports an auxiliary carriage 6 which is displaceable in the vertical direction; in this context, the term vertical relates to the circumstances in which an X-ray examining apparatus supporting the serial changer is in the upright position. The auxiliary carriage is displaced in known manner by means of a motor 7 which acts on a drive belt which is linked to the serial changer, the cassette carriage 2 and the auxiliary carriage 6 via rollers.

On the auxiliary carriage 6 there is provided a rocking lever 8 which is pivotable about an axis which extends perpendicular to the plane of drawing (and hence perpendicular to the "horizontal" and the "vertical" direction); to each of the two arms of said rocking lever there is linked a clamping jaw 9a, 9b so that in reaction to a pivotal motion of the lever 8 the two clamping jaws 9a and 9b are moved toward or away from one another in the same sense and over the same distance. Via a tension spring 10, the clamping jaws are pressed against the upper and the lower edge after insertion of a cassette 11 which is denoted only by broken lines for the sake of clarity. Thus the positions of the two clamping jaws 9a and 9b, that is to say their spacing, is determined by the height of the inserted cassette.

A lever 13 which is pressed against the right-hand edge of the cassette by a tensile spring 14 is also pivotable about the same axis 12 about which the rocking lever 8 is pivotable. Therefore, when the cassette is inserted this lever is pivotable to the right until a locking cam 15, secured to the lower clamping jaws 9b, engages behind the left-hand edge of the cassette. The angular position occupied by the lever 13, therefore, is a measure of the width of the cassette.

A marker in the form of a pointer 16 is rigidly connected to the rocking lever 8. Similarly, a further marker in the form of a sector 17 is connected to the lever 13, said sector being provided with an arc-shaped window 18. The two markers have a surface having a high optical reflection coefficient which can be obtained, for example by gold-plating, while the other parts of the cassette carriage have an essentially lower reflection coefficient.

When the cassette carriage 6 is displaced from the loading position shown in the drawing to the parking position at the right by the step motor 5, the two markers pass an optical sensor 19 (FIG. 1) which is rigidly connected to the serial changer 1 and which is situated in a plane parallel to the plane of drawing, the plane of the sensor being situated at a small distance from the planes of movement of the markers 16 and 17. The sensor 19 supplies a signal whose amplitude increases strongly when the markers 17 and 16 are situated directly therebelow.

Because the angular position of the markers 16 and 17 is determined by the height and the width of the cassette 11, and because the output signal of the optical sensor varies as a function of the travelling time of the cassette (in the case of a predetermined speed) or as a function of the travelling distance of the cassette in dependence of the angular position of the two markers 16 and 17 during the displacement of the cassette carriage to the parking position, the variation of the output signal of the optical sensor 19 is determined by the height and the width of the inserted cassette. The cassette format, that is to say the height and the width of the cassette, can thus be determined from the variation of the output signal of the optical sensor.

This procedure is illustrated by FIGS. 2 and 3 which show the angular positions of the markers 16 and 17 and the associated signal variations for different cassette formats. FIG. 2a shows the position of the markers 16 and 17 after insertion of a cassette for the smallest film format (width 13 cm, height 18 cm). The lever 13 is then situated comparatively far to the left, and so is the sector-shaped marker 17 connected thereto. The pointer 16, however, is situated comparatively far to the right, that is to say so far that it does not enter the arc-shaped window 18.

The line 20 denotes the level at which the optical sensor is situated. Thus, upon passage of the cassette carriage, the optical sensor first "sees" the highly reflective area of the marker 17 to the right of the window 18, subsequently the non-reflective window 18, and finally a part of the marker 17 again.

FIG. 3a shows the associated output signal of the opticalsensor, the representation being limited to a section between the displacement paths $x_1$ and $x_2$ ($x_2 > x_1$) which is chosen so as to be symmetrical with respect to the displacement path ($0.5 (x_2 + x_1)$) for which the pivot axis 12 of the markers 16, 17 is situated exactly in a plane which extends through the optical sensor 19 (FIG. 1) and perpendicular to the plane of drawing. The width of this section is chosen so that the associated sensor output signal variation differs for each cassette format.

FIG. 2b shows the angular position of the markers 16 and 17 when a cassette is inserted for a film having a width of 18 cm and a height of 24 cm. Because of the greater width, the marker 17 has been pivoted counter-clockwise through a given angle with respect to the position shown in FIG. 2a, while the pointer 16 has been pivoted clockwise because of the greater cassette height, so that it is now situated within the arc-shaped window 18. Thus, during the displacement of the cassette, the optical sensor first "sees" a part of the non-reflective arc-shaped window 18 during the first quarter of the section ($x_1$, $x_2$), subsequently the highly reflective pointer 16 during the second quarter of the section, and the non-reflective window again during the last two quarters of the section. The optical sensor thus supplies a signal having a high amplitude during the first quarter of the section $x_1$, $x_2$ in the case of the 13×18 cassette, while it supplies the signal of high amplitude during the second quarter of the section in the case of the 18×24 format.

FIG. 2c shows the angular positions of the markers 16 and 17 which occur when a cassette is inserted for a film format with a height of 24 cm and a width of 30 cm. The cassette thus has the same height as the cassette used in FIG. 2b; therefore, the pointer 16 which is coupled to the clamping jaws 9a and 9b is situated in the same position as shown in FIG. 2b, that is to say in a position in which its left-hand edge coincides exactly with the centre of the section $x_1$, $x_2$.

Because of the substantially greater width of the cassette, the marker 17 coupled to the lever 13 has been pivoted counter-clockwise through a substantial angle about the axis 12, so that the left-hand edge of the window 18 coincides with the centre of the section $x_1$, $x_2$.

Thus, during the first quarter the optical sensor covers the window 18 (no or only a low reflection), covers the pointer 16 during the second quarter (high reflection), and covers the highly reflective area of the sector-shaped section 17 during third thr and the fourth quarter of the section. Thus, the signal variation shown in FIG. 3c is obtained. Different signal variations can thus be unambiguously associated with the various cassette formats (for example, in accordance with DIN 6832), so that the cassette format can be unambiguously determined from the signal variation (during the section $x_1$, $x_2$).

Figure 4:
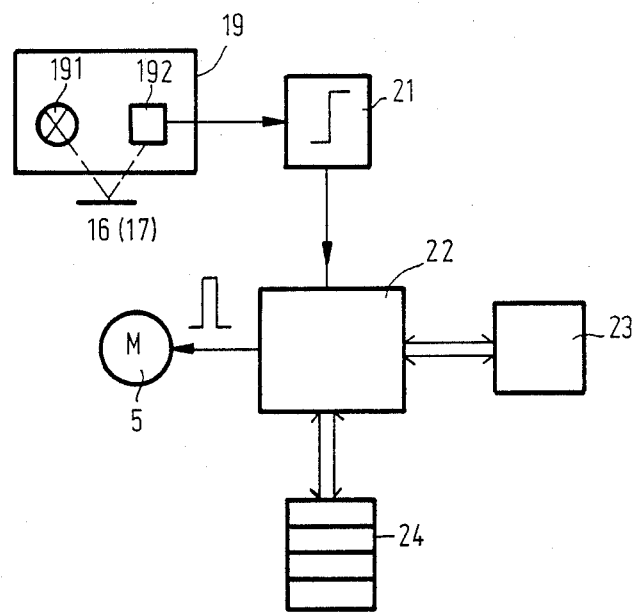
FIG. 4 shows a circuit for processing the sensor signals and for determining the cassette format.

FIG. 4 shows a block diagram of a circuit for determining and processing the signal variation. The optical sensor includes a light source 191, for example a light-emitting diode, and a transducer 192 which converts the light reflected by one of the markers 16 or 17 into an electric signal. Transducer 192 is, for example, a photodiode. The signal supplied by the transducer is applied, possibly after amplification, to a threshold value circuit 21 whose output signal assumes a first state when the signal amplitude remains below a threshold value, while it assumes a second state when the signal amplitude exceeds a threshold value. The threshold value is selected so that it is smaller than the signal occurring in reaction to the passage of one of the markers 16 or 17, and larger than the signal occurring when a non-reflective or only slightly reflective surface, such as the window 18, is situated at the area of the optical sensor. The output signal of the threshold value circuit 21 is applied to a control unit 22.

The control unit 22 supplies the control pulses for a stepping motor 15. Thus, in reaction to each control pulse the cassette carriage is displaced one step in the horizontal direction. After a given number of control pulses, the cassette carriage reaches the position $x_1$. While the control unit 22 supplies further control pulses at constant time intervals (so that the cassette carriage is displaced further at a constant speed), the control unit 22 at the same time interrogates the output state of the threshold value circuit 21 at constant intervals (because of the constant speed, interrogation takes place each time after a given number of steps), until after a further number of steps the position $x_2$ is reached.

The control unit 22 thus receives a series of binary signal values ("1" or "0") which form a binary signal which is stored in an intermediate memory 23. After the signal has been completely formed in the described manner, it is successively compared with a series of binary signals which are stored in a memory 24 and which correspond to the signal appearing on the output of the circuit 21 in reaction to the use of one of the various cassette formats. When correspondence is detected during one of the comparisons, the signal stored in the intermediate memory 23 corresponds to the cassette format with which the relevant signal from the read-only memory 24 is associated.

The value thus determined can be applied to a display unit. However, it can also be used in known manner for positioning the cassette carriage (for the displacement to the left from the parking position to the exposure position) or for the control of diaphragms situated in the serial changer or in the vicinity of the X-ray tube cooperating with the serial changer.

The control unit 22 may include, for example two microprocessors, one of which controls the cassette carriage, while the other microprocessor serves inter alia for the recognition of the cassette format. Both functions, however, can also be performed by a single microprocessor.

The markers 16, 17 can alternatively be detected in a different manner. For example, when the markers 16 and 17 contain a ferromagnetic material, use can be made of a Hall sensor which is activated in reaction to the passage of the markers. Similarly, the markers may be provided with projections which, upon passage, actuate a microswitch which acts as a sensor upon passage. Furthermore, the markers need not be shaped as shown in the FIGS. 1 and 2. For example, both markers may comprise a pointer. It is not necessary either for the pointers to be pivotable about the same axis.

In all cases, however, it is important that the markers are constructed and arranged so that the sensor can respond to the markers upon passage of the cassette carriage and that for each of the cassette formats used the position of at least one of the markers (measured in the direction of displacement of the cassette carriage) is clearly distinct from the positions for all other cassette formats.

I claim:

1. A serial changer which includes a cassette carriage provided with first and second clamping means for a cassette, the position of the first clamping means being determined by the height of the cassette while the position of the second clamping means is determined by the width of the cassette, and also includes a measuring device which determines the format of the cassette from the positions of the first and second clamping means, characterized in the that a first marker is pivotably coupled to the first clamping means so that the angular position of the first marker is a measure of the position of the first clamping means, a second marker is pivotably coupled to the second clamping means so that the angular position of the second marker is a measure of the position of the second clamping means, the measuring device including a sensor (19) which is rigidly connected to the serial changer and which detects the positions of the markers, said sensor being arranged so that the markers are guided past the sensor when the cassette carriage (2) is displaced.

2. A serial changer as claimed in claim 1, characterized in that the cassette is substantially planar and extends in vertical and horizontal directions, the first clamping means includes a pair of vertically displaceable clamping jaws (9a, 9b) which are coupled to both arms of a rocking lever (8) which is pivotable about an axis (12) extending perpendicular to the plane of the cassette so that the two clamping jaws are displaceable toward and away from one another in the same sense and over the same distance, the first marker (16) being rigidly connected to the rocking lever (8).

3. A serial changer as claimed in claim 2 characterized in that the second clamping means includes a lever (13) which is pivotable about an axis (12) extending perpendicular to the cassette plane and which presses against a vertical edge of the cassette (11), said lever (13) being rigidly connected to the second marker (17).

4. A serial changer as claimed in claim 3, characterized in that the rocking lever (8) and the lever (13) are pivotable about the same axis (12).

5. A serial changer as claimed in claim 4, characterized in that one marker is formed as a pointer (16) while the other marker is formed as a sector (17) provided with a cut-out (18).

6. A serial changer as claimed in claim 5, characterized in that each marker has a surface which is highly reflective for light, the sensor including a light source and a transducer which converts the reflected light into an electric signal.

7. A serial changer as claimed in claim 6, characterized in that the measuring device includes a memory (24) in which the variations of the sensor output signals for different cassette formats are stored, the format of the relevant inserted cassette being determined by comparison of the signal variations stored with the signal variation measured.

8. A serial cassette changer for a cassette having a height and a width, said cassette changer comprising:
   a housing;
   a cassette carriage for accommodating the cassette, said cassette carriage being slidably arranged on the housing;
   first clamping means on the cassette carriage, said first clamping means engaging the cassette, said first clamping means having a position determined by the height of the cassette;
   second clamping means on the cassette carriage, said second clamping means engaging the cassette, said second clamping means having a position determined by the width of the cassette;
   a first marker pivotably mounted on the cassette carriage, said first marker having an angular position, said first marker being coupled to the first clamping means so that the angular position of the first marker is a measure of the position of the first clamping means;
   a second marker pivotably mounted on the cassette carriage, said second marker having an angular position, said second marker being coupled to the second clamping means so that the angular position of the second marker is a measure of the position of the second clamping means; and
   a measuring device mounted on the housing, said measuring device detecting the angular positions of the first and second markers when the carriage is slid on the housing.

9. A serial cassette changer as claimed in claim 8, characterized in that the first clamping means comprises:
   a first lever pivotably mounted on the cassette carriage for rotation around a first pivot axis, said first lever having first and second arms on opposite sides of the pivot axis, said first lever being rigidly connected to the first marker;
   a first clamping jaw for engaging a first side of the cassette, said first clamping jaw being coupled to the first arm of the lever; and
   a second clamping jaw for engaging a second side of the cassette opposite the first side of the cassette, said second clamping jaw being coupled to the second arm of the lever.

10. A serial cassette changer as claimed in claim 9, characterized in that the second clamping means comprises:
   a second lever pivotably mounted on the cassette carriage for rotation around a second pivot axis, said second lever having an arm which engages a third side of the cassette said second lever being rigidly connected to the second marker; and
   a cam mounted on the cassette carriage for engaging a fourth side of the cassette opposite the third side of the cassette.

11. A serial cassette changer as claimed in claim 10, characterized in that:

the cassette is substantially planar; and the first and second pivot axes are substantially perpendicular to the plane of the cassette.

12. A serial cassette changer as claimed in claim 11, characterized in that the first and second pivot axes are the same axis.

13. A serial cassette changer as claimed in claim 12, characterized in that:

the measuring device comprises a light source and a light detector, said light detector generating an electric signal which represents the angular positions of the first and second markers;

the first marker comprises a reflective pointer; and the second marker comprises a reflective sheet with an opening therein.

14. A serial cassette changer as claimed in claim 13, characterized in that the measuring device further comprises:

memory means for storing signals corresponding to different cassette formats; and comparison means for comparing the electric signal generated by the light detector with the stored signals to determine the cassette format.

* * * * *